United States Patent
Kumar et al.

(10) Patent No.: US 8,802,801 B1
(45) Date of Patent: Aug. 12, 2014

(54) RECONFIGURABLE POLYMERIC SELF-HEALING COATING

(75) Inventors: Ashavani Kumar, Honolulu, HI (US); Vinod P. Veedu, Houston, TX (US); Venkat Kamavaram, Honolulu, HI (US); Sumil Thapa, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 0 days.

(21) Appl. No.: 13/429,943

(22) Filed: Mar. 26, 2012

Related U.S. Application Data

(60) Provisional application No. 61/467,523, filed on Mar. 25, 2011.

(51) Int. Cl.
  *C08F 218/00* (2006.01)
  *C08K 5/09* (2006.01)

(52) U.S. Cl.
  USPC ........ 526/319; 526/340.3; 524/270; 524/303; 524/315

(58) Field of Classification Search
  USPC ................ 526/319, 340.3; 524/270, 303, 315
  See application file for complete search history.

(56) References Cited

U.S. PATENT DOCUMENTS

| | | |
|---|---|---|
| 5,153,032 A | 10/1992 | Landers |
| 5,790,304 A | 8/1998 | Sanders |
| 7,192,993 B1 | 3/2007 | Sarangapani |
| 7,217,754 B2 | 5/2007 | Koloski |
| 7,723,405 B2 | 5/2010 | Braun |
| 2012/0082840 A1* | 4/2012 | Herr et al. ............ 428/221 |

* cited by examiner

*Primary Examiner* — Robert D. Harlan
(74) *Attorney, Agent, or Firm* — James Creighton Wray

(57) ABSTRACT

A self-healing polymer additive includes diene (e.g. butadiene, cyclohexadiene, pentadiene, tetrahydrofuron or their derivatives) and dienophile (e.g. maleic anhydride, maleamide, conjugated carbonyls or their derivatives etc.). One polymer includes tetrahydrofuron and maleimide. Furfurylamine 12 (1-10 gm) is diluted in acetone. Under an inert atmosphere an equivalent amount of granular maleic acid is added slowly, and the reaction is allowed to take place. Resulting maleamic acid precipitates. The maleamic acid product is separated, dried and purified by re-crystallization. The maleamic (1-5 gm) acid is dissolved in acetic anhydride along with a catalytic amount of sodium acetate. The resulting solution is heated for a few hours in 80-120° C. The precipitated final product is separated, purified and dried in a vacuum. The self-healing polymer is dissolved in a solvent, and self-healing molecules are cross linked and are mixed with a polymer matric for various applications such as coatings and structural materials.

11 Claims, 2 Drawing Sheets

RECONFIGURABLE POLYMERIC SELF-HEALING COATING

This application claims the benefit of U.S. Provisional Application No. 61/467,523, filed Mar. 25, 2011, which is hereby incorporated by reference in its entirety as if fully set forth herein.

BACKGROUND OF THE INVENTION

There are two approaches known for synthesis of self-healing polymer composite material, extrinsic self-healing and intrinsic self-healing.

In extrinsic self-healing, polymer composites include a polymer matrix containing sets of capsules or hollow fibers filled with healing agents and catalyst. Any damage or cracking of a polymer composite ruptures the capsules or hollow fibers that yield the healing agents, which fill the cracks via capillary forces. Subsequently, the healing agents undergo polymerization reaction due to catalyst present in the polymer composite and heal the cracks. Any existing self-healing approach occurs only for one time. Intrinsic self-healing only is effective for ultrafine cracks.

The conventional approaches involve extrinsic and intrinsic healing mechanism. In extrinsic healing, hollow fibers or capsules filled with healing agent and catalysts are encapsulated in polymer composite materials. The capsules rupture on damage of polymer composite, and healing agent is delivered, which fills the crack and is cured in presence of catalyst and heals the composite materials. The major issue with the approach is that it works only once and cannot heal any further damage after the capsules or hollow fibers are fractured and the curing agent is used.

Intrinsic healing involves extensive chemical modification of polymer chains of polymer composite which completely change various properties such as adhesion and mechanical properties, etc. Intrinsic self-healing coatings are not able to heal large cracks, which is a major drawback.

SUMMARY OF THE INVENTION

The invention provides a unique configurable lock and key polymer (LK polymer). The new LK polymer is compatible with a wide range of polymer matrixes used for various applications such as coating and structural materials. The polymer acts as a self-healing agent and can be blended with wide ranges of polymers for synthesis of self-healing composites. Unlike conventional approaches, the new invention does not require solvents or healing agent encapsulations for phase transitions or filling cracks.

The new LK self-healing polymer undergoes a liquid/solid reversible phase transition when subjected to heating and cooling cycles, leading to reorganization of the polymer chains and resulting in self-healing of damage to the polymer composites.

The new applications provide self-healable polymer composite structures.

The new LK self-healing coating or structural polymer composites provide self-healing for several repeated coating or structural damages and are effective for big crack sizes.

The invention has high commercial value. These new self-healing polymer composites increase shelf life and effectiveness of coatings or structural materials and reduce maintenance costs of structures.

The new self-healing polymer composites are useful for marine, automobile, aerospace and other structures. The new self-healing polymer composites provide extra protection to structures from corrosion, yield multi-functionality and reduce maintenance costs. Marine, automobile, aerospace and other companies and various defense organizations will be interested in this technology.

The new self-healing polymer composites heal large cracks or scratches, are compatibility with wide ranges of surfaces, are inexpensive, are environmentally benign, are durable and healable from repeated damages, have superior mechanical strength, and are provided for use with multi-functional coatings having corrosion resistant, antifouling and antimicrobial properties.

In the new invention, unique reconfigurable polymers are blended in the traditional polymer materials which together act as self-healing agents. These new recognizable polymers reorient themselves on heating, and thereby result in healing. The new self-healing polymer composites are based on reorganization of polymer and are highly reversible and repeatedly heal the coatings after number of damages. The new repeated healing does not result from existing technology. The new polymer is inexpensive, is easy to use and is compatible with ranges of coating materials, which makes the new coatings suitable for diverse application.

The new unique moldable lock and key polymer (LK polymer), unlike conventional approaches, does not require solvent encapsulation for phase transition and can be blended into the coating matrices of other polymers. The material undergoes a liquid/solid reversible phase transition when subjected to a heating and cooling cycle, leading to reorganization of the polymer chains, resulting in healing of damage to the coating.

These and further and other objects and features of the invention are apparent in the disclosure, which includes the above and ongoing written specification, with the claims and the drawings.

DETAILED DESCRIPTION OF THE DRAWINGS

LK polymer is composed of diene (e.g. butadiene, cyclohexadiene, pentadiene, tetrahydrofuron or their derivatives) and dienophile (e.g. maleic anhydride, maleamide, conjugated carbonyls etc.). As an example, the present self-healing polymer is composed of tetrahydrofuron and maleimide. The diene and a dienophile have the general formula $(X-CH_2-Y)_P$, wherein X is a diene, Y is a dienophile, and P is greater than or equal to 1.

Figure 1:
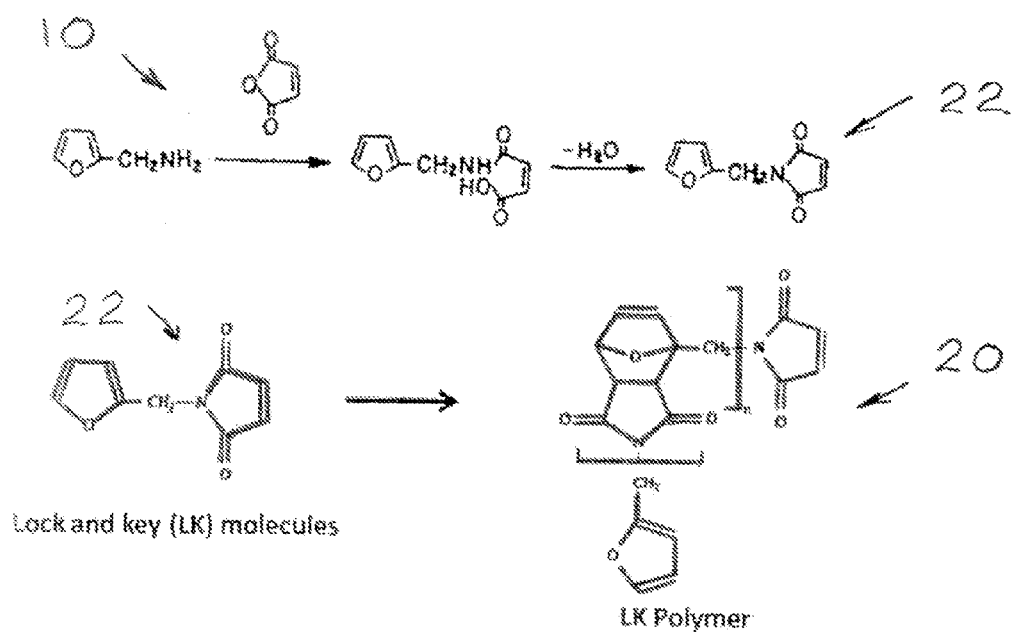
FIG. 1 shows a synthesis scheme for lock and key polymer.
Figure 2:
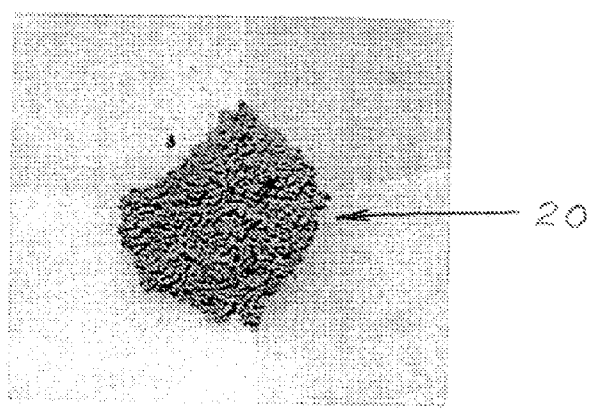
FIG. 2 is a photograph of purified LK polymer.

In a first example 10 as shown in FIG. 1, furfurylamine 12 (1-10 gm) is diluted in acetone. The solution was added to a round bottom flask. The flask was then filled with argon gas and cooled to ice temperature. An equivalent amount of granular maleic acid 14 was added slowly to the flask, and the reaction was allowed to take place under argon flow.

The solution 16 was poured from the flask into a beaker containing ice water causing a solid, maleamic acid, to precipitate. The maleamic acid product 18 was separated out, dried and purified by a re-crystallization process.

In the next step, maleamic (1-5 gm) acid was dissolved in a minimum amount of acetic anhydride along with a catalytic amount of sodium acetate. The resulting solution was heated for a few hours in an 80-120° C. temperature range and was then poured into a beaker of cold ice water and stirred vigorously overnight to precipitate out the product. The final product was separated out from water, purified and dried in a vacuum. The LK polymer 20 is dissolved in a solvent, and self-healing molecules 22 are cross linked and are mixed with the coating polymer.

A solubility study was conducted to find suitable blending solvents to mix the LK polymer into the coating matrices of other polymers.

Solubility of LK Polymer:

The solubility of LK polymer was measured in various solvent such as acetone, chloroform, deionized water ($H_2O$), dimethylformamide (DMF), hexane, isopropanol (99%), petroleum ether, and tetrahydrofuran (THF). In a typical experiment, eight 6 ml vials were each loaded with a 0.050 g sample of powdered LK polymer. Each solvent was added to its respective vial in 0.1 ml increments and given ample time to dissolve the sample under agitation between each addition. The volume of solvent was recorded when it appeared that the entire sample was dissolved. Table 1 summarizes the solubility of LK molecules in the tested solvents. LK molecules are clearly soluble in THF, chloroform and DMF.

TABLE 1

Comparison of solubility of LK molecules in a range of solvents.

| Solvent | Solubility (g/mL) |
| --- | --- |
| Water | NS |
| Isopropanol | NS |
| Petroleum ether | NS |
| Hexane | NS |
| Acetone | 0.01 |
| Chloroform | 0.17 |
| DMF | 0.17 |
| Tetra hydrofuran(THF) | 0.045 |

Self-Healing Property of LK Polymer:

First, a saturated solution of LK polymer was prepared in chloroform. This solution was drop coated onto a 2.5 cm² glass slide using a spin coater and allowed to dry overnight. The coated slide was scored with a cross mark using a razor and placed on a hot plate preheated to 100° C. for 5 minutes.

Figure 3:
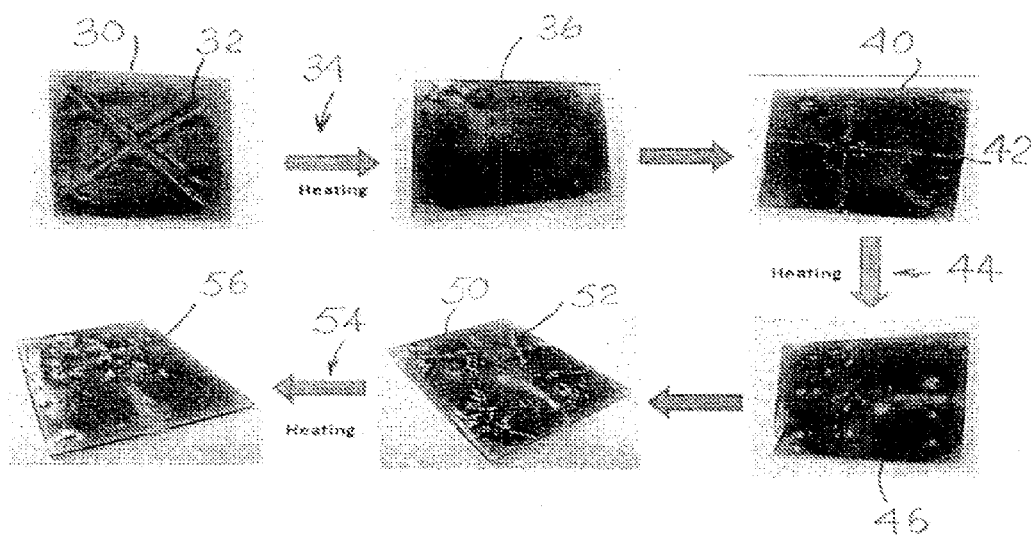
FIG. 3 shows the healing property of LK polymer film.

FIG. 3 depicts the LK coated glass slide 30 showing scoring damage 32 subsequent heating 34, cooling self-healing 36. Later, the glass slide 30 is scored 42 followed by heating 44 and self-healing 46.

Later, the glass slide 30 is scored 52 followed by heating 54, cooling and self-healing 56.

The self-healing is repeatable after several damages to the coating.

The LK polymer coating displays significant molecular reorientation on heating, essential for scratch healing.

After cooling for 1 minute, the slide 30 was again scored 42 with a razor and heat treated 44 for another 5 minutes. This was repeated for 3 cycles with the self-healing observed on each.

Preparation Self-Healing Coating:

After demonstrating the healing ability of the LK polymer, self-healing coatings were created using coating polymer such as vinyl ester resin (VE), epoxy, acrylic or alkyd resins. A range of polymer coating resin compositions were synthesized containing 1 wt %, 5 wt %, and 10 wt % of LK polymers. For a typical process, the LK polymer was first manually ground into a fine powder and mixed with coating polymer resin in a glass jar. An appropriate amount of surfacing agent (SA) was added to the mixture and stirred at 125 rpm for 15 minutes. Finally, hardener such as methyl ethyl ketone peroxide (MEKP) was added and stirred at 125 rpm for 5 minutes. Glass slides 70, 80, 90 were coated 72, 82, 92 and allowed to cure overnight.

Figure 4:
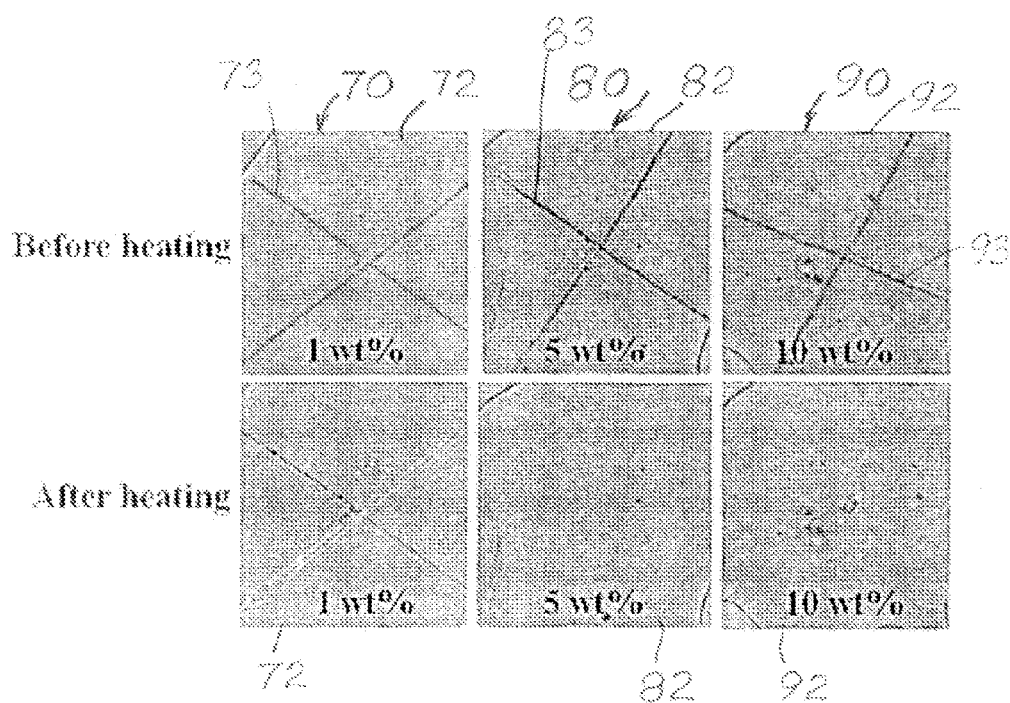
FIG. 4 shows self-healing of vinyl ester coating containing LK polymer.

The slides were scratched 73, 83, 93 as shown in the top half of FIG. 4 with a cross mark using a razor and then placed on a hot plate, preheated to 100° C. for one minute and allowed to cool for approximately 30 seconds before being examined for healing. As shown in the bottom half of FIG. 4, polymer coatings 92 with 10% wt LK polymer content displayed the best result. The coatings 82 with 5% wt LK polymer content showed slightly lower performance, and coatings 70 with 1% wt LK polymer content showed almost no healing.

In a typical healing mechanism, LK polymer 60 blended for example with the polymer coating matrix acts as the healing agent. On heating, the LK polymer breaks into liquid monomers 68 and fill cracks and scratches via capillary forces. On cooling, the LK molecules solidify. The uniformity of the coatings 82, 92 remains intact after multiple heating cycles.

While the invention has been described with reference to specific embodiments, modifications and variations of the invention may be constructed without departing from the scope of the invention, which is defined in the following claims.

We claim:

1. A product comprising a powdered self-healing polymer or nanocomposite materials comprising a diene and a dienophile having the general formula $(X—CH_2—Y)_P$, wherein X is a diene, Y is a dienophile, and P is greater than or equal to 1, combined, reacted, or diene or dienophile modified nanomaterials, and dried as a powder or dispersed/dissolved in solvent for mixing with a polymer or used as it is and producing a self-healing coating.

2. The product of claim 1, wherein the diene comprises allene, butadiene, cyclohexadine, pentadiene, Cyclooctadiene, Norbornadiene, Linoleic acid, tetrahydro furon, thiophene their derivatives or combinations thereof and the dienophile comprises maleic anhydride, maleamide, acrylonitrile, Dimethyl fumarate, Dimethyl acetylenedicarboxylate, 3-Buten-2-one, 1,4-Benzoquinone, their derivatives or combinations thereof.

3. The product of claim 1, wherein the powdered self-healing nanocomposite comprising diene or dienophile modified nanomaterials such as nanoparticles, nanorods, nanotube, nanowire, nanofibers selected from the group comprising 1) metal 2) metal oxide, 3) metal sulfide, 4) metal nitride, 5) carbon, 6) boron.

4. The product of claim 1, wherein the coating polymer is selected from the group comprising 1) siloxane, 2) polyesters, 3) poly acrylates, 4) epoxies, 5) ceramics or cementus materials, 5) rubbers 6) poly(olefin) such as poly butadiene, poly propylene, polyethylene, 7) alkyd resin, 8) asphalt materials, 9) polyether, 10) polyketone.

5. The product of claim 1, wherein the diene comprises tetrahydro furon or its derivatives and the dienophile comprises maleamide or its derivatives.

6. The product of claim 1, wherein furfurylamine or its derivatives is diluted in organic solvent such as, hexane, clyclohexane, alcohols, ketones, aldehyde and maleic acid or its derivatives is added slowly to the diluted furfurylamine in an inert atmosphere and a resultant maleic acid or its derivatives is precipitated, separated, dried, recrystallized and purified as a powder, converted to n-furfurylmaleimide or corresponding derivative and polymerize to poly (n-furfurylmaleimide) or corresponding derivative by refluxing in solvent in 50 to 120° C. temperature range, for mixing with the coating polymer.

7. A coating product containing the coating polymer resin, a self-healing polymer mixed in about 0.1% to 100% or more of the resin powder, wherein the self-healing powder comprises a diene and a dienophile having the general formula $(X\text{-}CH_2\text{-}Y)_P$, wherein X is a diene, Y is a dienophile, and P is greater than or equal to 1, combined, reacted and dried as a powder or dissolved in solvent for mixing with a coating polymer and producing a self-healing coating.

8. The coating product of claim 7, wherein the self-healing polymer comprises a diene and a dienophile combined, reacted and dried as a powder for mixing or dissolved in solvent with the coating polymer and producing a self-healing coating.

9. The product of claim 7, wherein the diene comprises, allene, butadiene, cyclohexadine, pentadiene, Cyclooctadiene, Norbornadiene, Linoleic acid, tetrahydro furon, Pyrrole, thiophene or their derivative and combinations thereof and the dienophile comprises maleic anhydride, maleamide, acrylonitrile, conjugated carbonyls such as Dimethyl fumarate, Dimethyl acetylenedicarboxylate, 3-Buten-2-one, 1,4-Benzoquinone or their derivative and combination maleic anhydride, maleamide, conjugated carbonyls or combinations thereof.

10. The product of claim 7, wherein the diene comprises tetrahydro furon and the dienophile comprises maleamide.

11. The product of claim 7, wherein the furfurylamine is diluted in acetone and the maleic acid is added slowly to the diluted furfurylamine in an inert atmosphere and a result maleic acid is precipitated, separate, dried, recrystallized and converted to n-furfurylmaleimide and polymerize to poly (n-furfurylmaleimide) by refluxing in solvent in 50 to 300° C. temperature range, for mixing with the coating polymer.

\* \* \* \* \*